United States Patent Office 3,158,613
Patented Nov. 24, 1964

3,158,613
THIAMINE DERIVATIVES
Akira Takamizawa, Ibaraki-shi, and Kentaro Hirai, Teramachi-dori, Shimogyo-ku, Kyoto-shi, Japan, assignors to Shionogi & Co., Ltd., Osaka-shi, Japan
No Drawing. Filed June 21, 1962, Ser. No. 204,056
Claims priority, application Japan Sept. 20, 1960
9 Claims. (Cl. 260—256.5)

This invention relates to thiol-type thiamine derivatives. It relates further to S-substituted thiol-type thiamines, especially S-alkoxycarbonylthiamines, and to processes for their production. Furthermore, it relates to compositions of matter containing the afore-mentioned compounds having pharmacological usefulness.

The said S-substituted thiol-type thiamines are representable by the formula:

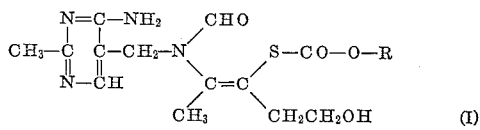

wherein R is a lower alkyl radical (preferably an alkyl radical having from 1 to 10 carbon atoms such as methyl, ethyl, propyl, isopropyl, butyl, isobutyl, tert-butyl, amyl, isoamyl, hexyl, heptyl, octyl, nonyl and decyl), a cyclo (lower)alkyl radical (preferably a cycloalkyl radical having from 5 to 6 carbon atoms such as cyclopentyl and cyclohexyl), a lower alkenyl radical (preferably an alkenyl radical having from 3 to 5 carbon atoms such as allyl, crotyl and pentenyl), a phenyl(lower)alkyl radical (preferably a phenylalkyl radical, the alkyl moiety having from 1 to 5 carbon atoms, such as benzyl, phenethyl and phenylpropyl) or a lower alkoxy(lower)alkyl radical (preferably an alkoxyalkyl radical having from 2 to 10 carbon atoms such as methoxymethyl, ethoxymethyl, ethoxyethyl, ethoxypropyl and butoxyethyl).

Since thiol-type thiamine was reported by Zima et al. [Zima et al.: Ber. 73, 941 (1940)]:

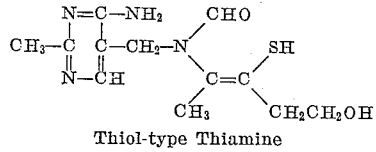

Thiol-type Thiamine there have been synthetsized some thiol-type thiamine derivatives. Some of these derivatives show rapid and prolonged vitamin $B_1$ activity [Matsukawa et al.: U.S. Patent 2,752,348; Fujiwara et al.: U.S. Patent 2,833,768]. Especially, thiamine propyl disulfide (TPD):

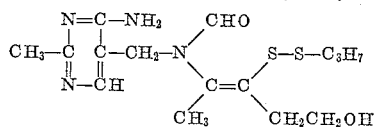

Thiamine Propyl Disulfide (TPD)

is well known, being on the market as an active vitamin $B_1$ agent (an agent showing rapid and prolonged vitamin $B_1$ activity). Others of the said derivatives show no or only slight vitamin $B_1$ activity. For instance, S-alkylthiamines have been reported to have no vitamin $B_1$ activity [Yamada et al.: J. Pharm. Soc. Japan, 76, 616 (1956);

Matsukawa: Yakugaku Kenkyu (Study on Pharmacy, 28, 427 (1956)]:

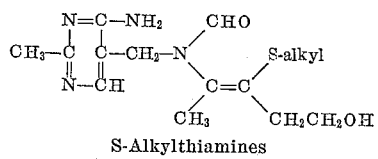

S-Alkylthiamines

As thiol-type thiamine derivative having an alkoxycarbonyl radical at the S- or O-position, there has been heretofore known only one compound, i.e. S-ethoxycarbonyl-O-benzoylthiamine [Shirakawa: J. Pharm. Soc. Japan, 74, 367 (1954)]. This compound, however, has only slight vitamin $B_1$ activity and has been rather assigned to the group of ineffective compounds together with said S-alkyl-thiamines and others [Matsukawa: Yakugaku Kenkyu (Study on Pharmacy), 28, 427 (1956)]:

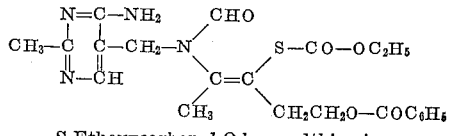

S-Ethoxycarbonyl-O-benzoylthiamine

The present invention embodies S-substituted thiol-type thiamines of Formula I which have unexpectedly excellent vitamin $B_1$ activity notwithstanding their close similarity to S-ethoxycarbonyl-O-benzoylthiamine and S-alkyl-thiamines in chemical structure. Further, it may be noted that S-substituted thiol-type thiamines of Formula I, especially S-alkoxycarbonyl-thiamines, are generally retained at a higher concentration in blood than thiamine propyl disulfide (TPD), known as one of the active vitamin $B_1$ agents, and for a longer time when orally administered.

Accordingly, a basic object of the present invention is to embody novel thiol-type thiamine derivatives and processes for their production. Another object of the invention is to embody thiol-type thiamine derivatives showing rapid and prolonged vitamin $B_1$ activity. A further object of the invention is to embody active vitamin $B_1$ agents suitable for oral administration in large quantities. A further object of the invention is to embody compositions of matter containing S-substituted thiol-type thiamines useful for the treatment of vitamin $B_1$ deficiency. These and other objects and the manner in which they are accomplished will become apparent to those conversant with the art from the following description of the general class of compounds and certain specific examples of particular members as well as general and specific methods for their production.

S-substituted thiol-type thiamines of Formula I may be prepared in a variety of different ways of which the more important can be expressed generically as comprising the interaction of alkali metal salts of thiol-type thiamine represented by the formula:

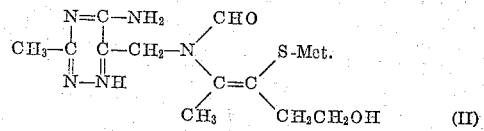

wherein Met. is an alkali metal (e.g. potassium or sodium) with reagents which can introduce the group represented by the formula:

—CO—O—R wherein R has the same significance as designated above.

The starting compounds, alkali metal salts of thiol-type thiamine of Formula II, may be prepared by reacting thiamine chloride hydrochloride with alkaline substances such as alkali metal, alkali metal hydroxide and alkali metal alkoxide according to a per se conventional manner. For instance, the sodium salt of thiol-type thiamine is prepared by treating thiamine chloride hydrochloride with three molar amounts of sodium alkoxide in a lower alkanol at room temperature (15 to 20° C.). Although the production of S-substituted thiol-type thiamines I is illustrated independently below, it may be usually carried out subsequent to the preparation of the alkali metal salts of thiol-type thiamine II.

As the reagent which can introduce the group represented by the formula:

—CO—O—R wherein R has the same significance as designated above, there may be enumerated, by way of example:

(a) Halogenocarbonates represented by the formula:

X—COOR wherein X is a halogen and R has the same significance as designated above (preferably chlorocarbonates), and (b) Nitrophenyloxycarbonates represented by the formula:

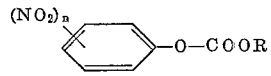

wherein $n$ is an integer from 1 to 3 and the nitro groups may be present at any position on the benzene ring, and R has the same significance as designated above (preferably p-nitrophenyl-oxycarbonates and 2,4-dinitrophenyloxycarbonates).

The reaction may be carried out by treating an alkali metal salt of thiol-type thiamine II with an equimolar amount of the said reagent in a suitable solvent such as water, lower alkanols and the mixture thereof. The addition of a basic substance such as trialkylamine, pyridine base and dialkylaniline may afford better results. Although the optimum reaction temperature should be based on the employed reagent and solvent, a temperature from 10 to 80° C. is normally adopted. Under these conditions, the reaction time is usually from 20 minutes to 3 hours. Both higher and lower temperature and shorter and longer reaction time are operative, the lower temperature usually requiring a correspondingly longer reaction time. When halogenocarbonates are employed, the previous saturation of the reaction medium with a water-soluble salt such as sodium chloride is desirable for crystallizing out the product completely.

The recovery of the thus-prepared S-substituted thiol-type thiamines I from the reaction mixture can be readily accomplished according to a per se conventional manner. When difficulties are encountered in crystallization, those compounds may be treated with mineral acids such as hydrochloric acid in the course of the recovery process whereby the mineral acid salts suitable for purification and crystallization are obtained.

The thus-obtained S-substituted thiol-type thiamines I and non-toxic salts thereof possess vitamin $B_1$ activity. Especially, it may be noted that these compounds can be rapidly absorbed from the intestinal canal and a high concentration of vitamin $B_1$ in blood is maintained for a long time, when orally administered.

Animal and clinical test date of compounds according to the present invention are shown in Tables I to VII in contrast with thiamine chloride hydrochloride and a commercially available active vitamin $B_1$ agent, thiamine propyl disulfide (TPD). In these tables, the compounds designated by an asterisk (*) are products of the present invention.

TABLE I

Changes of Vitamin $B_1$ Level in Blood After Oral Administration (Animal Test)

| Time (hours) | Vitamin $B_1$ concentration in blood ($\mu$g./dl.) | | | | | |
|---|---|---|---|---|---|---|
| | 0 | 0.5 | 1 | 3 | 5 | 8 |
| Thiamine chloride hydrochloride | 22.0 | 24.2 | 27.5 | 32.9 | 34.4 | 28.7 |
| Thiamine propyl disulfide | 23.1 | 38.9 | 50.9 | 62.9 | 52.3 | 39.7 |
| S-Ethoxycarbonylthiamine* | 22.0 | 51.0 | 70.0 | 81.2 | 71.5 | 48.7 |
| S-Propoxycarbonylthiamine* | 21.2 | 46.7 | 59.1 | 61.6 | 51.4 | 48.1 |
| S-Isopropoxycarbonylthiamine* | 24.6 | 32.5 | 45.5 | 73.6 | 69.5 | 50.6 |
| S-Butoxycarbonylthiamine* | 21.2 | 42.8 | 55.7 | 71.6 | 60.5 | 45.2 |
| S-Isobutoxycarbonylthiamine* | 21.9 | 32.9 | 41.3 | 54.9 | 56.6 | 40.7 |
| S-Isoamyloxycarbonylthiamine* | 21.3 | 40.0 | 51.4 | 58.1 | 55.0 | 43.9 |
| S-Cyclohexyloxycarbonylthiamine* | 23.7 | 54.1 | 59.8 | 54.3 | 51.1 | 43.4 |
| S-Allyloxycarbonylthiamine* | 27.0 | 50.9 | 65.8 | 86.3 | 74.1 | 54.8 |
| S-Benzyloxycarbonylthiamine* | 26.5 | 30.2 | 49.4 | 62.1 | 61.6 | 49.3 |
| S-Phenethyloxycarbonylthiamine* | 20.0 | 49.1 | 58.9 | 66.0 | 61.6 | 48.5 |
| S-($\beta$-methoxyethoxycarbonyl)-thiamine* | 24.1 | 38.7 | 49.8 | 70.7 | 59.5 | 37.7 |

Test dosage: Amount equivalent to 5 milligrams of thiamine chloride hydrochloride per kilogram of body weight.
Mode of administration: Oral.
Test animals: Rabbits.

TABLE II

Changes of Vitamin $B_1$ Level in Blood After Oral Administration (Animal Test)

| Time (hours) | Vitamin $B^1$ concentration in blood ($\mu$g./dl.) | | |
|---|---|---|---|
| | 1 | 3 | 6 |
| None | 29.2±1.09 | | |
| Thiamine chloride hydrochloride | 40.4±1.02 | 36.1±1.32 | 35.8±1.87 |
| Thiamine propyl disulfide | 88.4±3.46 | 58.8±1.32 | 44.1±1.30 |
| S-Ethoxycarbonylthiamine* | 107.1±6.59 | 69.1±3.18 | 48.7±3.37 |
| S-Butoxycarbonylthiamine* | 99.0±3.65 | 63.3±1.09 | 45.7±2.34 |
| S-Allyloxycarbonylthiamine* | 102.3±8.44 | 72.7±1.95 | 41.6±1.71 |

Test dosage: Amount equivalent to 5 milligrams of thiamine chloride hydrochloride per kilogram of body weight.
Mode of administration: Oral.
Test animals: Rats.

TABLE III

Changes of Vitamin $B_1$ Concentration in Liver After Oral Administration (Animal Test)

| Time (hours) | Vitamin $B^1$ concentration in liver ($\mu$g./g.) | | |
|---|---|---|---|
| | 1 | 3 | 6 |
| None | 9.8±0.42 | | |
| Thiamine chloride hydrochloride | 12.7±0.33 | 12.3±0.34 | 12.8±0.21 |
| Thiamine propyl disulfide | 18.5±0.35 | 14.9±0.58 | 12.7±0.46 |
| S-Ethoxycarbonylthiamine* | 16.2±0.87 | 13.3±0.56 | 12.4±0.54 |
| S-Butoxycarbonylthiamine* | 18.2±0.80 | 15.5±0.66 | 13.2±0.38 |
| S-Allyloxycarbonylthiamine* | 16.3±0.51 | 14.0±0.43 | 12.3±0.62 |

Test dosage: Amount equivalent to 5 milligrams of thiamine chloride hydrochloride per kilogram of body weight.
Mode of administration: Oral.
Test animals: Rats.

TABLE IV

*Gastrointestinal Absorption*

| | Vitamin B¹ concentration in blood (μg./dl.) | | Amount of vitamin B₁ excreted in urine within 6 hours (μg.) |
|---|---|---|---|
| | Before administration | 3 hours after administration | |
| Thiamine chloride hydrochloride | 6.97 | 8.76 | 969±67 |
| Thiamine propyl disulfide | 7.19 | 15.82 | 7,034±314 |
| S-Ethoxycarbonylthiamine* | 7.04 | 27.35 | 7,587±385 |
| S-Butoxycarbonylthiamine* | 6.43 | 15.84 | 6,681±47 |
| S-Allyloxycarbonylthiamine* | 6.70 | 20.97 | 7,115±589 |

Test dosage: Amount equivalent to 50 milligrams of thiamine chloride hydrochloride per test subject.
Mode of administration: Oral.
Test subjects: Human.

TABLE V

*Changes of Vitamin B₁ Level in Blood After Subcutaneous Injection (Animal Test)*

| | Vitamin B¹ concentration in blood (μg./dl.) | | | | |
|---|---|---|---|---|---|
| Time (hours) | 0 | 0.5 | 1 | 3 | 6 |
| Thiamine chloride hydrochloride | 22.4 | 59.5 | 56.3 | 41.0 | 29.7 |
| Thiamine propyl disulfide | 24.6 | 116.6 | 111.8 | 89.4 | 65.6 |
| S-Ethoxycarbonylthiamine* | 22.2 | 59.8 | 76.7 | 71.3 | 51.2 |
| S-Butoxycarbonylthiamine* | 23.1 | 60.4 | 58.4 | 48.7 | 38.1 |
| S-Allyloxycarbonylthiamine* | 26.7 | 82.2 | 93.0 | 75.1 | 56.3 |

Test dosage: Amount equivalent to 1 milligram of thiamine chloride hydrochloride per kilogram of body weight.
Mode of administration: Subcutaneous.
Test animals: Rabbits.

TABLE VI

*Changes of Vitamin B₁ Level in Blood After Intravenous Injection (Animal Test)*

| | Vitamin B₁ concentration in blood (μg./dl.) | | | | | |
|---|---|---|---|---|---|---|
| Time (Minutes) | 0 | 1 | 10 | 30 | 60 | 180 |
| Thiamine chloride hydrochloride | 26.7 | 274.7 | 117.1 | 61.7 | 51.5 | 36.2 |
| Thiamine propyl disulfide | 24.5 | 366.0 | 264.2 | 247.5 | 223.5 | 156.0 |
| S-Ethoxycarbonyl-thiamine* | 26.2 | 81.8 | 77.5 | 83.7 | 86.8 | 64.0 |
| S-Butoxycarbonyl-thiamine* | 21.0 | 118.7 | 84.5 | 77.3 | 68.1 | 57.6 |
| S-Allyloxycarbonyl-thiamine* | 22.2 | 108.8 | 76.4 | 73.2 | 72.1 | 54.8 |

Test dosage: Amount equivalent to 1 milligram of thiamine chloride hydrochloride per kilogram of body weight.
Mode of administration: Intravenous.
Test animals: Rabbits.

TABLE VII

*Acute Toxicity (Animal Test)*

| | LD₅₀ (mg./kg.) | | |
|---|---|---|---|
| Administration | Intravenous | Subcutaneous | Oral |
| Thiamine chloride hydrochloride | 94.8 | 447.8 | 9,160 |
| Thiamine propyl disulfide | 286.7 | 450.9 | 3,890 |
| S-Ethoxycarbonyl-thiamine hydrochloride* | 585.7 | 2,891.5 | 12,352 |
| S-Butoxycarbonyl-thiamine hydrochloride* | 509.3 | 2,376.7 | 4,000~8,000 |
| S-Allyloxycarbonyl-thiamine* | 456.0 | | |

Test animals: Mice.

The S-substituted thiol-type thiamines I and non-toxic salts thereof have no unpleasant odor such as thiamine propyl disulfide (TPD) and its analogous compounds have.

As disclosed above, the S-substituted thiol-type thiamines I are useful as active vitamin B₁ agents, and are especially suitable for oral administration. In view of better absorption and less toxicity, these compounds may be used to realize such high vitamin B₁ concentration in the blood by oral administration in large quantities as was heretofore obtained only by injection.

The active vitamin B₁ agents, S-substituted thiol-type thiamines I and non-toxic salts thereof, are conveniently administered in dosage unit form, as carried by a suitable pharmaceutical carrier, particularly for prophylaxis and treatment of vitamin B₁ deficiency. Normally, the preparations are orally administered, although they are just as effective when otherwise administered. They may be administered in various dosages such as 10, 20, 30, 50, 100, 150, 200 or 300 milligrams, although the unit dosage range may vary more broadly from about 5 to about 500 milligrams and preferably from about 10 to about 300 milligrams. They may be added to or otherwise used with various pharmaceutical carriers. By way of exemplification, various solid carriers may be employed such as lactose, mannitol, cornstarch, talc and magnesium stearate as well as other tableting aids and fillers. If desired, some other ingredients such as riboflavin, pyridoxin, folic acid, biotin, inositol, mineral salts and the like may be mixed with the said active vitamin B₁ agents. The medicinal mixture may then be tableted or encapsulated in a hard gelatine capsule, depending on the commercial unit form desired. Ordinarily tableting is preferred. The amount of carrier or diluent may vary, according to tablet size desired or whether the dosage is made up in encapsulated form, from zero amount to the maximum amount consistent with the practical limits of bulk for a dosage unit. Normally the carrier with which the medicament is mixed does not exceed about 300 to about 500 milligrams.

The following examples illustrate presently preferred methods of carrying out the present invention.

In these examples, "Thia" represents the partial structure encompassed by the dotted line in the following formula of thiamine:

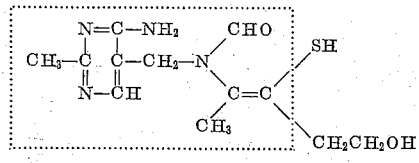

Other abbreviations have conventional significances; thus "g." signifies "gram" or "grams," "ml." signifies "milliliter" or "milliliters."

EXAMPLE I

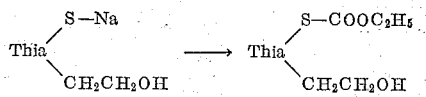

To a solution of sodium chloride (0.6 g.) in water (2 ml.), there are added tributylamine (0.6 g.) and ethyl chlorocarbonate (0.4 g.). To the resultant mixture, there is added sodium salt of thiol-type thiamine (1 g.) while stirring. Stirring is continued to precipitate a white viscous oil, which is gradually solidified. The resulting solid is collected by filtration, washed with water and dried to yield crude S-ethoxycarbonylthiamine (1 g.). The crude product is recrystallized from ethanol-ethyl acetate to yield colorless cubic crystals (0.8 g.) melting at 140° C. (decomp.)

*Analysis.*—Calcd. for C₁₅H₂₂O₄N₄S: C, 50.83; H, 6.26; N, 15.81; S, 9.05. Found: C, 51.01; H, 6.56; N, 15.53; S, 9.55.

By treatment of S-ethoxycarbonylthiamine with hydrochloric acid, there is obtained S-ethoxycarbonylthiamine hydrochloride melting at 172 to 173° C. (decomp.).

EXAMPLE II

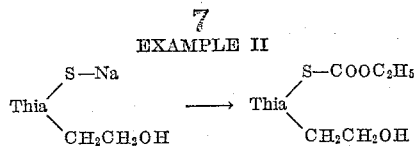

Thiamine chloride hydrochloride (1.1 g.) is dissolved in a solution of sodium hydroxide (0.4 g.) in water (5 ml.), and the resultant solution is saturated with sodium chloride. Then, ethyl chlorocarbonate (0.36 g.) is added with stirring while ice-cooling to precipitate a viscous oil, which is gradually solidified. The solid is collected by filtration, washed with water and crystallized from ethyl acetate to give S-ethoxycarbonylthiamine (0.7 g.) as colorless short pillars melting at 140° C. (decomp.).

EXAMPLE III

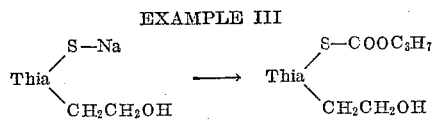

To a solution of thiamine chloride hydrochloride (1.1 g.) in water (1.5 ml.), there is added a solution of sodium hydroxide (0.4 g.) in water (1 ml.) while ice-cooling, and the resultant solution is allowed to stand for 30 minutes. After the addition of propyl chlorocarbonate (0.4 g.), the resulting mixture is stirred for a while to precipitate crystals. After 30 minutes, the crystals are collected by filtration and recrystallized from ethyl acetate to yield S-propoxycarbonylthiamine (0.8 g.) as colorless prisms melting at 156 to 157° C. (decomp.).

*Analysis.*—Calcd. for $C_{16}H_{24}O_4N_4S$: C, 52.15; H, 6.57; N, 15.21. Found: C, 52.21; H, 6.94; N, 14.87.

EXAMPLE IV

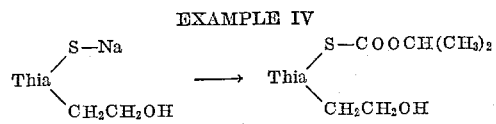

To a solution of thiamine chloride hydrochloride (3.3 g.) in water (3 ml.), there is added a solution of sodium hydroxide (1.2 g.) in water (4 ml.) while ice-cooling, and the resultant solution is allowed to stand for 30 minutes. After the addition of isopropyl chlorocarbonate (1.3 g.), the resulting mixture is stirred for a while to precipitate a viscous oil. The oil is separated and dissolved in ethanol. The ethanol solution is adjusted to pH 2 with 5% hydrochloric acid and then concentrated under reduced pressure. The residue is treated with ethyl acetate, and the obtained product is crystallized from ethanol-ethyl acetate to give S-isopropoxycarbonylthiamine hydrochloride (1.3 g.) as colorless crystals melting at 173° C. (decomp.).

*Analysis.*—Calcd. for $C_{16}H_{24}O_4N_4S \cdot HCl$: C, 47.44; H, 6.22; N, 13.84; S, 7.92; Cl, 8.76. Found: C, 47.48; H, 6.44; N, 13.85; S, 7.90; Cl, 8.74.

By treatment of S-isopropoxycarbonylthiamine hydrochloride with sodium hydroxide, there is obtained S-isopropoxycarbonylthiamine melting at 157° C. (decomp.).

EXAMPLE V

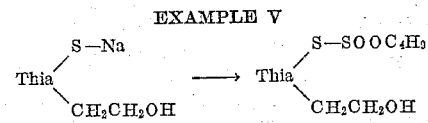

To a solution of thiamine chloride hydrochloride (1.1 g.) in water (1.5 ml.), there is added a solution of sodium hydroxide (0.4 g.) in water (1.5 ml.) while ice-cooling, and the resultant solution is allowed to stand for 30 minutes. After the addition of butyl chlorocarbonate (0.6 g.), the resulting mixture is stirred for 1 hour to precipitate crystals. The crystals are collected by filtration and recrystallized from ethyl acetate to give S-butoxycarbonyl thiamine (0.6 g.) as prisms melting at 139 to 140° C. (decomp.).

*Analysis.*—Calcd. for $C_{17}H_{26}O_4N_4S$: C, 53.38; H, 6.85; N, 14.65; S, 8.38. Found: C, 52.97; H, 7.16; N, 14.77; S, 8.03.

By treatment of S-butoxycarbonylthiamine with hydrochloric acid, there is obtained S-butoxycarbonylthiamine hydrochloride melting at 169 to 170° C. (decomp.).

EXAMPLE VI

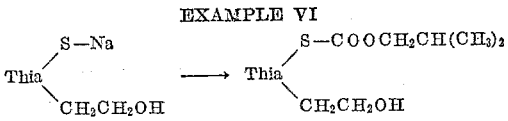

To a solution of thiamine chloride hydrochloride (3.3 g.) in water (4 ml.), there is added a solution of sodium hydroxide (1.2 g.) in water (1.5 ml.) while ice-cooling, and the resultant solution is allowed to stand for 30 minutes. After the addition of isobutyl chlorocarbonate (1.5 g.), the resulting mixture is stirred for a while to precipitate a viscous oil, which is gradually solidified. The solid is collected by filtration and crystallized from benzene to give S-isobutoxycarbonylthiamine (1 g.) as colorless prisms melting at 142 to 143° C. (decomp.).

*Analysis.*—Calcd. for $C_{17}H_{26}O_4N_4S$: C, 53.38; H, 6.85; N, 14.65; S, 8.39. Found: C, 53.58; H, 6.96; N, 14.29; S, 8.29.

EXAMPLE VII

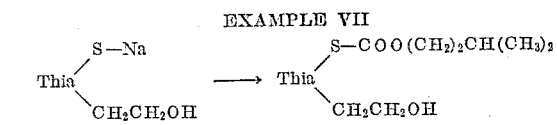

Thiamine chloride hydrochloride (3.3 g.) is dissolved in a solution of sodium hydroxide (1.2 g.) in water (9 ml.) and allowed to stand for 30 minutes. Isoamyl chlorocarbonate (1.5 g.) is added to the resultant solution with stirring while ice-cooling. The precipitated viscous substance is extracted with ethyl acetate. The extract is dried over magnesium sulfate. The solvent is removed and the residue is treated with ether to crystallize. The resulting crude crystals are recrystallized from benzene to give S-isoamyloxycarbonylthiamine (0.4 g.) as colorless prisms melting at 134 to 136° C. (decomp.).

*Analysis.*—Calcd. for $C_{18}H_{28}O_4N_4S$: C, 54.78; H, 7.33; N, 14.17; S, 8.04. Found: C, 54.52; H, 7.12; N, 14.13; S, 8.09.

EXAMPLE VIII

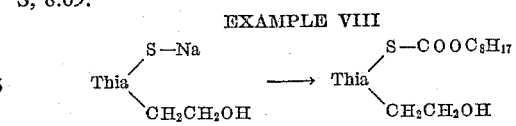

To a solution of thiamine chloride hydrochloride (3.3 g.) in water (3 ml.), there is added a solution of sodium hydroxide (1.2 g.) in water (3 ml.) while ice-cooling, and the resultant solution is allowed to stand for 30 minutes. The solution is then saturated with sodium chloride. After the addition of octyl chlorocarbonate (2 g.), the resulting mixture is stirred for a while. The precipitated viscous substance is extracted with chloroform and the extract is dried over anhydrous sodium sulfate. Removing the solvent, the residue is crystallized from ethyl acetate and recrystallized from ethyl acetate to yield S-octyloxycarbonylthiamine as colorless needles melting at 165° C. (decomp.).

*Analysis.*—Calcd. for $C_{21}H_{34}O_4N_4S \cdot 2H_2O$: C, 53.14; H, 7.86; N, 11.81. Found: C, 53.03; H, 7.56; N, 12.01.

EXAMPLE IX

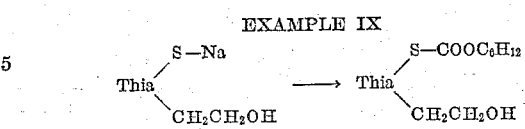

To a solution of thiamine chloride hydrochloride (3.3 g.) in water (5 ml.), there is added a solution of sodium hydroxide (1.2 g.) in water (4 ml.) while ice-cooling, and the resultant solution is allowed to stand for 30 minutes. The solution is then saturated with sodium chloride. After the addition of cyclohexyl chlorocarbonate (1.6 g.), the resulting mixture is stirred for 4 hours while ice-cooling. The precipitated viscous substance is extracted with chloroform. The chloroform extract is dried over magnesium sulfate and the solvent is removed. The residue is crystallized from ether and the crystals are recrystallized from ethyl acetate to give S-cyclohexyloxycarbonylthiamine (0.4 g.) as colorless pillars melting at 152 to 154° C. (decomp.).

*Analysis.*—Calcd. for $C_{19}H_{28}O_4N_4S$: C, 55.86; H, 6.91; N, 13.71. Found: C, 56.07; H, 6.90; N, 13.61.

EXAMPLE X

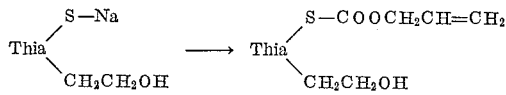

To a solution of thiamine chloride hydrochloride (3.3 g.) in water (3 ml.), there is added a solution of sodium hydroxide (1.2 g.) in water (3 ml.) while ice-cooling, and the resultant solution is allowed to stand for 30 minutes. After the addition of allyl chlorocarbonate (1.2 g.), the resulting mixture is stirred for a while to precipitate crystals. The crystals are collected by filtration and recrystallized from ethyl acetate to yield S-allyloxycarbonylthiamine (1.6 g.) as colorless pillars melting at 135° C. (decomp.).

*Analysis.*—Calcd. for $C_{16}H_{22}O_4N_4S$: C, 52.45; H, 6.05. Found: C, 52.35; H, 6.24.

EXAMPLE XI

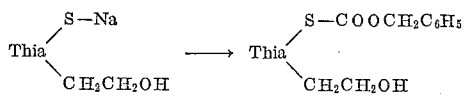

To a solution of thiamine chloride hydrochloride (3.3 g.) in water (4 ml.), there is added a solution of sodium hydroxide (1.2 g.) in water (3 ml.) while ice-cooling, and the resultant solution is allowed to stand for 30 minutes. After the addition of benzyl chlorocarbonate (1.8 g.), the resulting mixture is stirred for a while to precipitation a viscous substance. The substance is dissolved in ethanol, adjusted with 5% hydrochloric acid to about pH 2 and concentrated under reduced pressure. The residue is treated with ethyl acetate and the resultant crude crystals are recrystallized from ethanol-ethyl acetate to give S-benzyloxycarbonylthiamine hydrochloride (0.6 g.) as crystals melting at 157 to 159° C. (decomp.).

*Analysis.*—Calcd. for $C_{20}H_{24}O_4N_4S \cdot HCl$: C, 53.04; H, 5.52; N, 12.38; S, 7.07; Cl, 7.85. Found: C, 53.13; H, 5.48; N, 13.44; S, 6.98; Cl, 7.88.

By treatment of S-benzyloxycarbonylthiamine hydrochloride with sodium carbonate, there is obtained S-benzyloxycarbonylthiamine melting at 140° C. (decomp.).

EXAMPLE XII

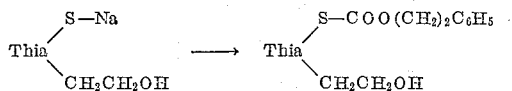

To a solution of thiamine chloride hydrochloride (3.3 g.) in water (4 ml.), there is added a solution of sodium hydroxide (1.2 g.) in water (3 ml.) while ice-cooling, and the resultant solution is allowed to stand for 30 minutes. After the addition of phenethyl chlorocarbonate (1.9 g.), the resulting mixture is stirred for a while to precipitate a viscous substance. The substance is dissolved in ethanol, adjusted with 5% hydrochloric acid to about pH 2 and concentrated under reduced pressure. The residue is treated with ethyl acetate and the resultant crude crystals are recrystallized from ethanol-ethyl acetate to give S-phenethyloxycarbonylthiamine hydrochloride (0.5 g.) as crystals melting at 171 to 173° C. (decomp.).

*Analysis.*—Calcd. for $C_{21}H_{26}O_4N_4S \cdot HCl$: C, 54.01; H, 5.61; N, 12.00; S, 6.87; Cl, 7.59. Found: C, 54.12; H, 6.13; N, 11.67; S, 6.65; Cl, 7.35.

By treatment of S-phenethyloxycarbonylthiamine hydrochloride with sodium carbonate, there is obtained S-phenethyloxycarbonylthiamine melting at 147° C. (decomp.).

EXAMPLE XIII

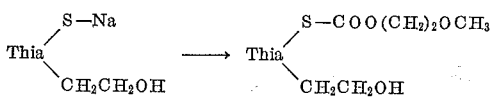

To a solution of thiamine chloride hydrochloride (3.3 g.) in water (4 ml.), there is added a solution of sodium hydroxide (1.2 g.) in water (5 ml.), and the resultant solution is allowed to stand for 30 minutes while ice-cooling. After the addition of β-methoxyethyl chlorocarbonate (1.4 g.), the resulting mixture is stirred for 1.5 hours. The precipitated substance is collected by filtration, dried and recrystallized from ethyl acetate to yield S-(β-methoxyethoxycarbonyl)-thiamine (1.8 g.) as colorless needles melting at 127 to 128° C. (decomp.).

*Analysis.*—Calcd. for $C_{16}H_{24}O_5N_4S$: C, 49.98; H, 6.29; N, 14.57. Found: C, 50.15; H, 6.43; N, 14.55.

EXAMPLE XIV

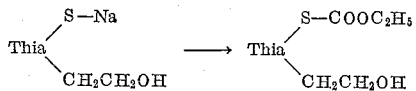

A mixture of sodium salt of thiol-type thiamine (3.6 g.) and ethyl 2,4-dinitrophenyloxycarbonate (2.6 g.) in ethanol (50 ml.) is refluxed for 1.5 hours. The insoluble substance is removed by filtration. The filtrate is concentrated to precipitate 2,4-dinitrophenol. After removing the 2,4-dinitrophenol by filtration, the filtrate is evaporated to dryness. The residue is dissolved in a small amount of water, extracted with ethyl acetate and shaken with 5% hydrochloric acid. The hydrochloric acid layer is neutralized with sodium bicarbonate and shaken with chloroform. The chloroform extract is dried over anhydrous sodium sulfate and evaporated to dryness. The residue is crystallized from ethanol-ethyl acetate to yield S-ethoxycarbonylthiamine (2.0 g.) as colorless cubic crystals melting at 140° C. (decomp.).

EXAMPLE XV

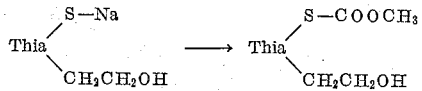

Thiamine chloride hydrochloride (31 g.) is dissolved in a solution of sodium hydroxide (11 g.) in water (70 ml.), and the resultant solution is allowed to stand for 30 minutes. Then, methyl chlorocarbonate (8.69 g.) is added with stirring while ice-cooling, and stirring is continued for 1 hour. The reaction mixture is extracted with chloroform. The chloroform extract is dried over magnesium sulfate and concentrated under reduced pressure. The residue is crystallized from acetone and recrystallized from acetone-ether to give S-methoxycarbonyl-thiamine (30 g.) as colorless plates.

EXAMPLE XVI

| | Kilograms |
|---|---|
| S-ethoxycarbonylthiamine hydrochloride | 2.90 |
| Lactose | 7.84 |
| Cornstarch | 2.78 |
| Magnesium stearate | 2.24 |

The above ingredients are mixed together and slugged. The slugs are crushed and passed through a 30 mesh screen. The resulting granules are mixed with magnesium stearate (2.24 kilograms) and tabletted in the usual way to give 100,000 tablets. Each tablet weighing 180 milligrams contains 29.0 milligrams of S-ethoxycarbonylthiamine hydrochloride (equivalent to 25 milligrams of thiamine chloride hydrochloride).

This application is a continuation-in-part of copending application Serial No. 137,539 filed September 12, 1961, and now abandoned.

What is claimed is:

1. S-substituted thiol-type thiamine of the formula

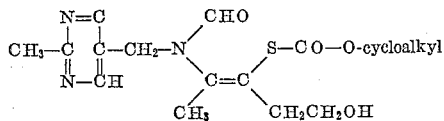

wherein the cycloalkyl group is selected from the class consisting of cyclopentyl and cyclohexyl.

2. S-substituted thio-type thiamine of the formula

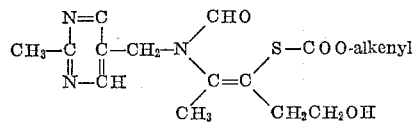

wherein the alkenyl group is selected from the class consisting of allyl, crotyl and pentenyl.

3. S-substituted thiol-type thiamine of the formula $$CH_3-\underset{\underset{CH}{\overset{\|}{N}}}{\overset{\overset{N=C}{|}}{C}}\overset{CHO}{\underset{\underset{CH_3}{|}}{C}}-CH_2-\underset{\underset{CH_2CH_2OH}{|}}{\overset{\overset{|}{}}{N}}\overset{}{\underset{C=C}{}}S-CO-O-\text{(lower) alkylene-phenyl}$$

4. S-substituted thiol-type thiamine of the formula $$CH_3-\underset{\underset{CH}{\overset{\|}{N}}}{\overset{\overset{N=C}{|}}{C}}\overset{CHO}{\underset{\underset{CH_3}{|}}{C}}-CH_2-\underset{\underset{CH_2CH_2OH}{|}}{\overset{\overset{|}{}}{N}}\overset{}{\underset{C=C}{}}S-CO-O-\text{(lower) alkylene-lower alkoxy}$$

5. S-cyclohexyloxycarbonylthiamine.
6. S-allyloxycarbonylthiamine.
7. S-benzyloxycarbonylthiamine.
8. S-phenethyloxycarbonylthiamine.
9. S-($\beta$-methoxyethoxycarbonyl)-thiamine.

References Cited in the file of this patent
UNITED STATES PATENTS
2,752,348    Matsukawa et al. -------- June 26, 1956